No. 719,756. PATENTED FEB. 3, 1903.
S. C. C. CURRIE.
MECHANISM FOR MIXING AND STORING LIQUIDS AND GASES FOR ORE TREATMENT.
APPLICATION FILED MAR. 4, 1902.
NO MODEL.
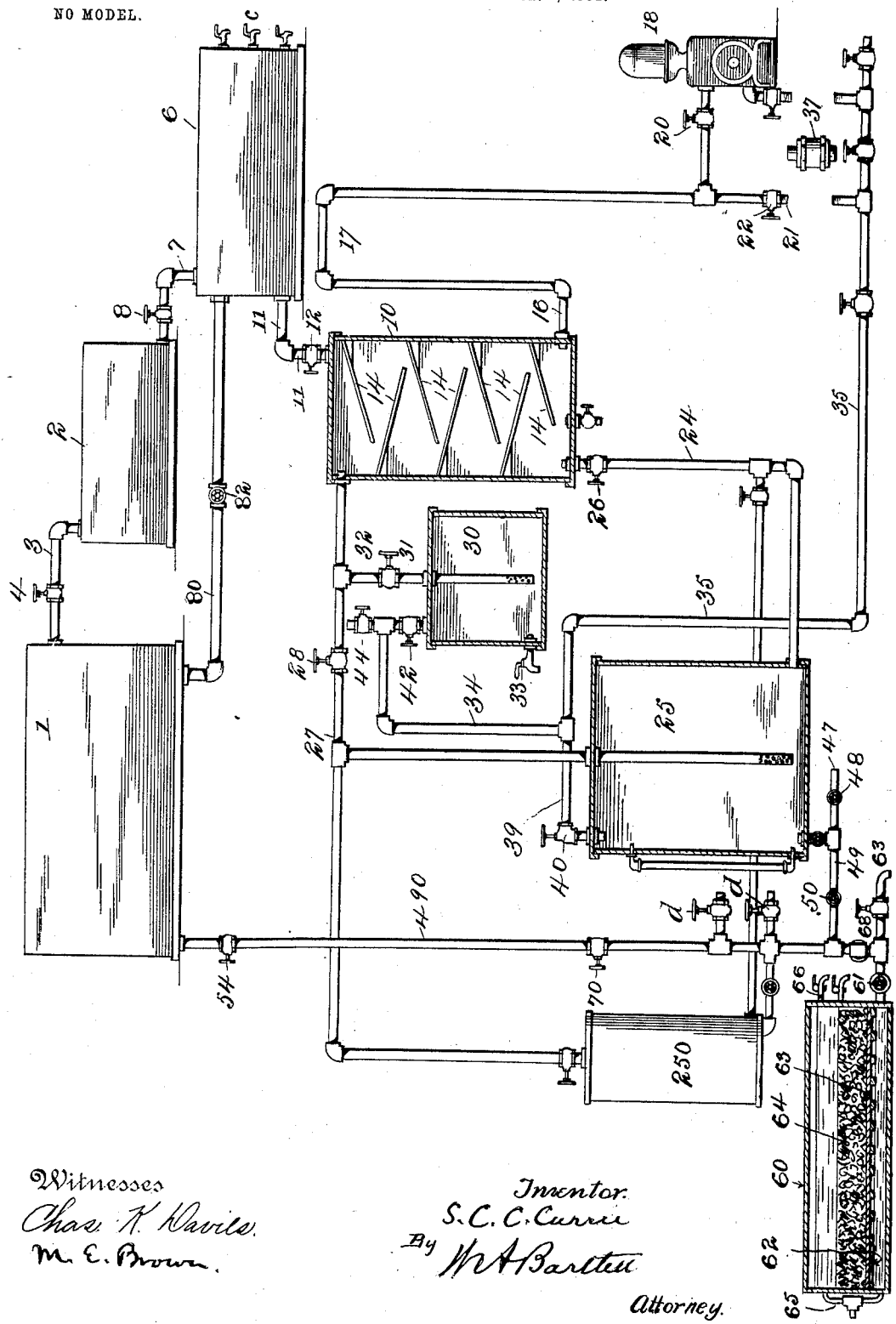
Witnesses
Chas. K. Davies.
M. E. Brown.
Inventor.
S. C. C. Currie
By W. A. Bartlett
Attorney.

UNITED STATES PATENT OFFICE.

STANLEY CHARLES CUTHBERT CURRIE, OF NEW YORK, N. Y., ASSIGNOR OF ONE-HALF TO WILLIAM COURTENAY, OF NEW YORK, N. Y.

MECHANISM FOR MIXING AND STORING LIQUIDS AND GASES FOR ORE TREATMENT.

SPECIFICATION forming part of Letters Patent No. 719,756, dated February 3, 1903.

Application filed March 4, 1902. Serial No. 96,591. (No model.)

*To all whom it may concern:*

Be it known that I, STANLEY CHARLES CUTHBERT CURRIE, a subject of the King of Great Britain, residing at New York, in the county of New York and State of New York, have invented certain new and useful Improvements in Mechanism for Mixing and Storing Liquids and Gases for Ore Treatment, of which the following is a specification, reference being had therein to the accompanying drawing.

This invention relates to mechanism for mixing and storing liquids and gases whereby the mixing of the gases may go on continuously, but the mixtures of liquid and absorbed gas may be stored in such quantities as may be desirable and may be drawn from the storage-tanks under such conditions as the circumstances of usage may warrant.

The object of the invention is to so control the production of mixed gases and liquids in any given time and to regulate the production in accordance with the requirements that the cost of production is minimized and the convenience of operation is increased.

The mechanism is particularly used in the production of chlorinated liquids which are used as solvents in the extraction of gold from ores, as described in my Patents No. 604,167, of May 17, 1898, and No. 690,361, of December 31, 1901.

As described in the above-mentioned patents, I use liquors consisting of a mixture of chlorin-gas and caustic-alkali solutions. Now it is essential for the economical and efficient working of the processes as described in said patents that there should be ready and available at all times sufficient quantities of the various stock solutions to meet the daily requirements. Moreover, as the daily requirements are liable to vary considerably not only as to quantities, but also as to the relative proportions of the mixture, in order to meet with such a variable demand by the ordinary method of dissolving certain proportions of caustic soda in water in closed tanks and then inserting the chlorin gas into same until saturated it would require the expenditure of much labor and time. It would also necessitate the making of quantities much in excess of the probable requirements in order to allow for unforeseen contingencies.

Now by the use of my present apparatus the required solutions run continuously, ready for use, into what I term "stock-solution tanks," the rate of flow being regulated by the adjustment of the two main valves—one controlling the flow of the alkaline solution, the other controlling the flow of chlorin gas. These two (the alkaline solution and the chlorin gas) meet in what I designate as a "mixing-chamber," the arrangement of and construction of said mixing-chamber being such that the alkaline solution flows down a series of surfaces suitably arranged in the form of thin layers of liquid and meets an upward flow of chlorin gas, with which the chamber is fully charged. The amount of surface exposed to the gas, the rate of flow of both liquid and gas, being so adjusted that on arriving at the bottom of the mixing-chamber the solution is fully charged—in other words, saturated with chlorin—the solution thus fully charged flows directly into the stock-tanks, from which it may be drawn off in such quantities as may be required.

As described in my Patent No. 690,361, of December 31, 1901, I may require two or more stock-tanks, each containing different proportions of caustic soda in the original caustic-soda solution.

I will now describe an apparatus by which the process can be carried out as described.

The figure is a diagram showing, partly in elevation and partly in section, a mechanism by which the mixed liquids and gases may be produced and stored.

It is not intended that the sizes or proportions of the various parts shall be shown, but only such indication given as will enable a person skilled in this art to construct and use the device.

The numeral 1 indicates a water-tank, which is supposed to be always filled with water from any suitable source of supply.

Numeral 2 represents a tank for the reception of caustic soda or caustic potash. For convenience this tank is connected by a pipe 3 with tank 1, and cock 4 controls said pipe or passage.

The caustic soda or potash is introduced into tank or box 2, and the mixing is done in any suitable manner. The caustic solution of the required strength is passed to alkali-stock tank 6 through pipe 7, which pipe is controlled by a cock 8. The tank 6 is supposed to always contain a quantity of the caustic-alkaline solution. A mixing-chamber 10 is placed on a lower level than tank 6, so that the caustic-alkaline solution may flow from tank 6, the supply being controlled through pipe 11 by cock 12.

Stock-tank 6 should have gage-cocks $c$ or other suitable means for ascertaining the quantity and quality of its contents.

Chamber 10 is made of material not much affected by chlorin gas, or is lined or coated with such material. It is a closed chamber (shown in section) and has inclined shelves 14 14, of glass preferably, and extending alternately from one side nearly to the other side of the chamber and overlapping, so that a liquid which flows from pipe 11 onto the top shelf will flow down said shelf in a thin film and fall from the end of the shelf onto the next lower shelf, which is inclined in opposite direction, and so flow back and forth along shelves 14, falling from the end of each shelf.

A supply of chlorin gas is introduced into chamber 10, near the bottom, from pipe 16, which enters the mixing-chamber below the lowermost inclined shelf. Pipe 16 rises above the mixing-chamber, as at 17, so that no liquid can flow back from the mixing-chamber. Pipe 17 may receive its supply of chlorin gas from pump 18, the flow of gas being controlled by cock 20, or the chlorin gas may come from a gas producer or holder of any suitable form through pipe 21, which is controlled by cock 22. The pump may get its gas-supply from any suitable source. As the supply of caustic fluid may be controlled by cock 12 and the supply of chlorin gas by cocks 20 and 22, it follows that the proportions of the gas to the liquid may be regulated up to the point of saturation of the liquid by the gas. By-pipe 80, controlled by cock 32, permits of a ready reduction of strength of the solution in tank 6. The liquid containing such gas as has been absorbed therein is conveyed by pipe 24 to the chlorinated-liquid-storage tank 25. A cock 26 may govern the passage to this storage-tank 25, which should always contain a quantity of caustic alkali saturated or containing a strong infusion of chlorin.

Should any of the chlorin gas fail of absorption by the liquid in chamber 10, this gas may flow by pipe 27 to the storage-tank 25 and may there be absorbed by the liquid if the liquid is not already saturated. Cock 28 controls this passage. Pipe 27 extends nearly to the bottom of tank 25 and is preferably perforated at its lower end. It is, however, preferable that the gas which may escape from mixing-chamber 10 be conducted to a tank or vessel 30 by pipe 31, controlled by cock 32.

Any gas which may accompany the chlorin gas may in this manner be conveyed to tank 30. The liquid in tank 30 may be drawn off through cock 33. As the tank 30 is below the pipe connection to the mixing-chamber, there can be no backflow of liquid therein to said mixing-chamber. Any gas may be drawn off through pipe 34, and thence through pipe 35 may be returned to pipe 21 or to pump 18. A union-coupling 37 may be used to make connections, or any other usual form of coupling may be used. Pipe 31 should extend nearly to the bottom of the overflow gas-absorption tank 30.

Any chlorin gas from the upper part of tank 25 may be drawn off through pipe 39, and so by pipe 35 to the chlorin-supply.

Cocks 40 and 42 control the gas-passages in the pipes just above referred to, and cock 44 controls an outlet by which gas other than chlorin may be allowed to escape.

From storage-tank 25 the chlorinated liquid may be carried to place of usage through pipe 49, controlled by cock 50. This liquid may be diluted by water entering by pipe 490 and controlled by cock 70.

A tank 250 is preferably supplied, the same having similar supply and outlet connections to those described for tank 25. Some of these connections are omitted in the drawings for clearness in illustration. Tank 250 is, in effect, a duplicate of tank 25, except as to size, and may be used to store chlorinated liquid of different strength from that contained in tank 25.

The tanks 25 and 250 (and as many others as may be desired, which are supposed to store liquid of the character contained in tank 25, but of different degrees of strength, and to be connected to branches $d\ d$) communicate with the operating-vat 60 through pipe 61, which has a suitable cock. The vat 60 may be of wood or other material internally painted or coated with some material which will protect the vat from the action of chlorin or acids used in the process. A short distance above the bottom of the vat there is a perforated false bottom 62, which is preferably covered with asbestos cloth 63, and on this the ore 64 is placed. A pump 65 at the end of the vat may be used to produce circulation of the liquid in tank 60, the preferable direction being such that the liquid rises upward through the ore. The liquid may be drawn off through any one of several cocks 66.

The method of using the vat 60 is clearly described in my Patent No. 690,361, hereinbefore referred to—that is, the chlorinated liquids of different degrees of strength as to alkali or as to chlorin are produced and stored in the tanks. The ore to be treated is placed in the operating-vat. Then the liquid desired, either water or a chlorinated liquid from one of the tanks, or both, may be admitted to the operating-tank and kept in circulation through the ore as long as desirable.

One grade of liquid may be drawn off and replaced by another and the treatment thus continued as long as advisable.

From the foregoing it should appear that my apparatus supplies a convenient means for introducing all the different qualities of liquids described in my Patent No. 690,261 directly to the ore under treatment, that a sufficient quantity of strong chemical may be stored up and immediately changed to a more dilute form or a different proportion of ingredients, and that the work of mixing gas with the caustic solution may proceed whether the liquid is or is not immediately used, or vice versa. After the chlorinated liquid is drawn from the storage-tank it may be diluted by water, or either water or the chlorinated fluid may be used separately. The mechanism gives the operator complete control of the quantity and quality of the liquid which passes from the apparatus to the ore under treatment.

What I claim is—

1. In an apparatus of the character described and in combination, a water-tank, a caustic-alkali tank at a lower level than said water-tank and having a pipe communicating with the water-tank, an alkali-stock tank at a still lower level than the caustic-alkali tank, and a pipe connecting the caustic-alkali tank and stock-tank, a mixing-chamber below said alkali-stock tank and a pipe connecting the two, and a by-pipe leading from the water-tank to the alkali-stock tank, all said pipes having controlling-cocks, substantially as described.

2. In an apparatus as described, a water-tank at the highest level, a caustic-alkali tank at a level below the water-tank, an alkali-stock tank at a still lower level, a pipe leading from the water-tank to the caustic-alkali tank, a pipe leading from the caustic-alkali tank to the alkali-stock tank, a mixing-chamber below the alkali-stock tank and a pipe connecting the two, a by-pipe connecting the water-tank to the alkali-stock tank, a cock controlling each of said pipes, inclined shelves in the mixing-chamber, and a chlorin-gas-supply pipe entering said mixing-chamber near the bottom, all combined.

3. In an apparatus of the character described, the combination of the alkali-stock tank, the mixing-chamber at a lower level than said tank and having inclined shelves extending alternately from opposite sides of the chamber, a pipe connecting the alkali-stock tank to the mixing-chamber and a cock controlling said pipe, and a chlorin-gas-supply pipe extending from above the level of the mixing-chamber and entering said chamber below the lower shelf.

4. In an apparatus of the character described, the combination of the alkali-stock tank, the mixing-chamber below the same and a pipe connecting the two and controlled by a cock, said mixing-chamber having inclined shelves extending alternately from opposite sides, a chlorin-gas-supply pipe extending from above the level of the mixing-chamber and entering said chamber below the lower shelf, and a storage-tank having pipe connection to the upper portion of the mixing-chamber and having a chlorin-absorbing material in its lower portion.

5. In combination, an alkali-mixing tank, an alkali-stock tank at a lower level and connected by a pipe thereto, a mixing-chamber at a level below the alkaline-storage tank, said mixing-chamber having inclines leading from opposite sides, a chlorin-gas-supply pipe leading from above the top of the mixing-chamber into the bottom thereof, a storage-tank for chlorinated liquid below the level of the mixing-tank, and a gas-supply pipe leading from the top of the mixing-chamber nearly to the bottom of the storage-tank.

6. The combination of the alkaline-stock tank, a mixing-chamber below the level thereof and having pipe connection thereto, a chlorin-gas-supply pipe leading from above the mixing-chamber into the lower part thereof, a chlorinated-liquid-storage tank at a lower level and connected to the mixing-tank, and an overflow gas-absorption tank connected to the top of the mixing-tank.

7. The combination of the alkaline-storage tank, the mixing-tank connected thereto by a suitable pipe, said mixing-tank having a chlorin-gas inlet, the chlorinated-liquid-storage tank and a pipe connecting the same to the mixing-tank, the overflow gas-absorption tank arranged below the top of the mixing-tank, and a pipe leading from the upper part of the mixing-tank to the lower part of said absorption-tank.

8. The combination of the mixing-tank having liquid and chlorin-gas supply pipes as described, the chlorinated-liquid-storage tank, and the overflow gas-absorption tank, both these latter provided with return-passages for gas leading through suitable couplings to the chlorin-supply pipe and the necessary pipe connections between said tanks.

9. The combination of the alkaline-liquid-storage tank, a mixing-chamber connected thereto and a chlorin-gas-supply pipe leading to the mixing-chamber, a chlorinated-liquid-storage tank connected to the mixing-chamber, and a water-supply pipe leading to the chlorinated-liquid-storage tank.

10. The combination with the mixing-chamber having inclines therein, of an alkaline-supply tank connected thereto, a chlorin-supply pipe leading into the lower part of the mixing-chamber, a pump connected to this chlorin-supply pipe, and a liquid-storing tank connected to the bottom of the mixing-chamber, and a gas-absorption tank connected to the top of the mixing-chamber but below the level thereof.

11. The combination of the mixing-chamber provided with inclines, the alkaline-supply tank and the chlorin-gas pipe connected to said mixing-chamber, a pump connected to the gas-supply pipe, a chlorinated-liquid-storage tank below the level of the mixing-chamber, and a return-pipe leading back from the top of said storage-tank to the pump.

12. The operating-tank having a perforated false bottom, a supply-pipe entering said tank below the false bottom, a plurality of storage-tanks having separate pipes communicating with said supply-pipes, each controllable by a valve, and means for forcing circulation through the perforated false bottom, all combined.

In testimony whereof I affix my signature in presence of two witnesses.

STANLEY CHARLES CUTHBERT CURRIE.

Witnesses:
BERTRAM C. SMITH,
M. E. BROWN.